(12) United States Patent
Van Loon et al.

(10) Patent No.: US 7,467,520 B2
(45) Date of Patent: Dec. 23, 2008

(54) REFRIGERATION UNIT

(75) Inventors: Laurentius Petrus Joseph Van Loon, Slootdorp (NL); Joost Cornelis Geluk, Geulle (NL)

(73) Assignee: Driessen Aerospace Group N.V., Wieringerwerf (NL)

( * ) Notice: Subject to any disclaimer, the term of this patent is extended or adjusted under 35 U.S.C. 154(b) by 541 days.

(21) Appl. No.: 10/545,445

(22) PCT Filed: Feb. 12, 2004

(86) PCT No.: PCT/NL2004/000104
§ 371 (c)(1),
(2), (4) Date: Aug. 15, 2005

(87) PCT Pub. No.: WO2004/071239
PCT Pub. Date: Aug. 26, 2004

(65) Prior Publication Data
US 2006/0162343 A1  Jul. 27, 2006

(30) Foreign Application Priority Data
Feb. 13, 2003  (NL) .................................. 1022674

(51) Int. Cl.
*F25B 21/02* (2006.01)

(52) U.S. Cl. .......................................... 62/3.61; 62/3.6
(58) Field of Classification Search .................... 62/3.6, 62/3.61
See application file for complete search history.

(56) References Cited

FOREIGN PATENT DOCUMENTS

| DE | 2 435 225 | 4/1980 |
|---|---|---|
| DE | 43 08 144 | 10/1994 |
| DE | 295 17 940 | 1/1996 |
| EP | 1 260 153 | 11/2002 |
| GB | 2 165 041 | 4/1986 |

*Primary Examiner*—Melvin Jones
(74) *Attorney, Agent, or Firm*—Young & Thompson

(57) ABSTRACT

A cooling unit (1) for a service trolley for use in an aircraft or train. The cooling unit (1) includes a drawer. The drawer contains a layer of heat-insulating material (29) and one or more Peltier elements (42) located in the layer (29) with a warm side (43) facing the one side of the heat-insulating layer (29) and a cold side (44) facing the other side of the heat-insulating layer (29). First fans (32) are provided on the cold side (44) of the heat-insulating layer (29) and second fans (33) are provided on the warm side (43) of the heat-insulating layer (29). The invention furthermore relates to a service trolley provided with a cooling unit (1) according to the invention as well as to a rack (60) for a multiplicity of cooling units (1) according to the invention. Finally, the invention relates to an aircraft or train containing a cooling unit or service trolley according to the invention.

19 Claims, 4 Drawing Sheets

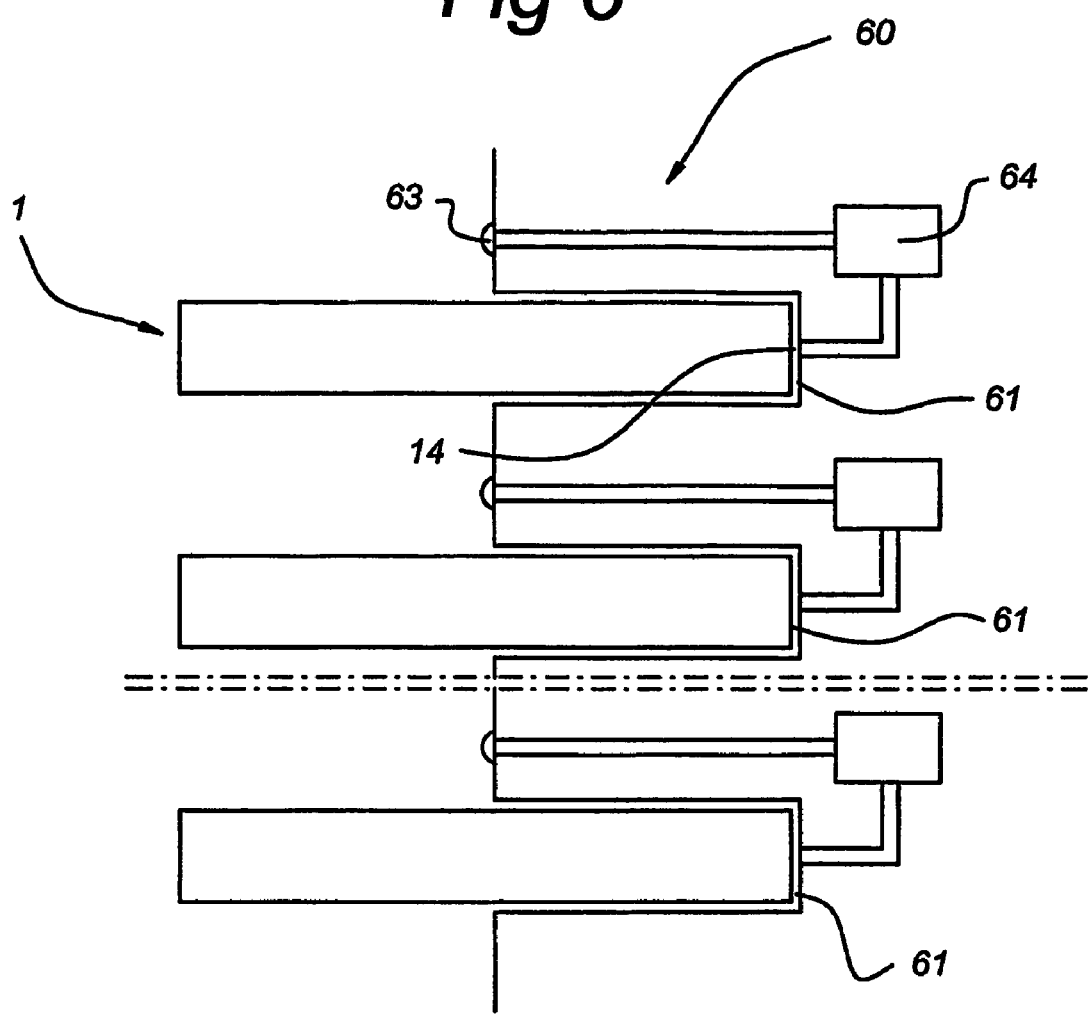

REFRIGERATION UNIT

The present invention relates to a cooling unit for a service trolley for use in an aircraft or train, the cooling unit comprising a drawer, and the drawer comprising:

- a partition, which partition separates a warm and cold zone in the drawer;
- one or more Peltier elements with a side that gives off heat and a side that takes up heat;
- one or more first fans provided in the cold zone for feeding air to be cooled through the cold zone;
- one or more second fans provided in the warm zone for feeding air removing heat through the warm zone.

Both in aircraft and in trains it is known that service trolleys are used for catering. Catering products, such as meals, snacks, drinks—both alcoholic and non-alcoholic, also including coffee and tea-, soups, tobacco products, duty free goods, etc. are then stored in the service trolleys. The service trolley usually consists of a cabinet placed on wheels, which is open from one side or at least is provided with doors in order to be able to open it. Inside the cabinet rails are provided along opposing side walls, into which drawers are slid in which the catering products to be distributed are stored. These service trolleys are usually filled with the catering products by catering companies outside the aircraft/the train. In the case of certain catering products it is important that they are cooled in order to guarantee the shelf life. To provide this cooling it is customary that a drawer containing so-called dry ice is placed in the cabinet, usually approximately in the middle. Dry ice, for example $CO_2$, gives a substantial cooling effect on evaporation thereof. The disadvantage of dry ice is that on evaporation $CO_2$ is released into the aircraft or into the train, which is undesirable for various reasons. A further disadvantage is that the cooling effect comes to an end as soon as all the dry ice has evaporated.

A cooling unit according to the precharacterising clause of Claim 1 is disclosed in DE 4 308 144. This publication discloses a service trolley for use in aircraft. The service trolley has a drawer-like cooling unit. A partition 26 provided in the cooling unit divides the interior of the service trolley into a top and a bottom between which there is no exchange of air flows. According to the text, the cooling unit is provided with Peltier elements, which are not shown in the drawings. In order, on the one hand, to keep the air in the warm top of the service trolley in motion and, on the other hand, to keep the air in the cold bottom of the service trolley in motion, the cooling unit is provided with fans (9 and 9A) for the top and fans (9B and 9C) for the bottom. These fans provide recirculation in the top section of the interior of the service trolley and the bottom section of the interior of the service trolley, respectively. No air is drawn in from outside or blown out to the outside. The cooling unit is thus in communication with the interior of the service trolley both at the top of the partition and at the bottom of the partition. A disadvantage of the service trolley and cooling unit from DE 4 308 144 is that, on the one hand, heat exchange will take place via the cooling unit between the bottom section and the top section of the interior of the service trolley, in particular via the partition, and that, on the other hand, as a consequence of the recirculation of the air in the interior of the service trolley the cooling capacity in the cold section of the interior of the service trolley is relatively limited or at least directly linked to a higher temperature in the warm section of the interior of the service trolley.

The aim of the present invention is, now, to provide an improved cooling unit for a service trolley for an aircraft or train, which cooling unit does not have the abovementioned disadvantages associated with dry ice.

According to the invention, the abovementioned aim is achieved by providing a cooling unit according to the precharacterising clause of Claim 1 which is characterised in that the partition comprises a layer of heat-insulating material and in that the one or more Peltier elements are located in the heat-insulating layer with the side giving off heat facing the warm zone and with the side taking up heat facing the cold zone.

Peltier elements are known per se from the state of the art. In general, a Peltier element is made up of a number of semiconductor blocks, so-called P/N transitions, which are fixed between two ceramic plates. The ceramic plates serve as electrical insulators. If an electric current now flows through the semiconductor blocks in one direction, the heat is also transported from the one side to the other side of the semiconductor blocks. To improve the heat exchange, heat exchangers are usually fitted on that side of the ceramic plates that faces away from the semiconductor blocks.

The cooling unit according to the invention is in the form of a drawer, which makes it easy to fit the cooling unit in a conventional service trolley for use in an aircraft or train. Because the cooling unit is constructed as a drawer, it is furthermore possible to remove the cooling unit from the service trolley should this not be needed. This can be utilised, inter alia, to check the functioning of the cooling unit. A layer of heat-insulating material is fitted in the drawer, in which material, in turn, the Peltier elements are located. In this way, on the one hand, the drawer is divided into a cold and a warm zone, cooling of the cold zone by the warm zone being counteracted and, on the other hand, a space-saving configuration is obtained by accommodating the Peltier elements in the heat-insulating layer. In order to improve the cooling effect, fans are provided on both sides of the heat-insulating layer for supplying air to be cooled to the cold side and removing heat from the warm side, respectively.

In order further to improve the cooling effect it is preferable, according to the invention, if one or more heat-conducting first heat exchangers joined to the cold side of the Peltier elements are provided in the cold zone and if one or more heat-conducting second heat exchangers joined to the warm side of the Peltier elements are provided in the warm zone, the first heat exchangers, the heat-insulating layer and the walls of the drawer together dividing the cold zone into a first inlet chamber with a first inlet opening into the service trolley and into a first outlet chamber with a first outlet opening into the service trolley. In this way it can be ensured that on the cold side the air to be cooled is drawn in via the first inlet and is then fed through the first heat exchangers before being returned via the outlet to the area to be cooled.

With this arrangement it is furthermore advantageous according to the invention if the orifices of the first inlet and the first outlet both extend in a horizontal plane and and if, preferably, the first outlet is so constructed that the outflow direction is at an angle and oriented away from the vertical axis through the first inlet. With this arrangement the orifices of the first inlet and of the first outlet can be provided in the ceiling and/or in the base of the drawer. The ceiling and/or the base of the drawers are precisely those parts of the drawers that face the interior of the cabinet of the service trolley, at least assuming that the drawer is not placed completely at the top or at the bottom of the cabinet, in which case only the base or the ceiling of the drawer, respectively, will be facing the interior of the cabinet. In this way good ventilation of the interior of the cabinet with cooled air is ensured.

In order to improve the removal of heat from the warm zone, it is advantageous according to the invention if the second heat exchanger, the heat-insulating layer and the walls of the drawer divide the warm zone into a second inlet chamber with a second inlet and a second outlet chamber with a second outlet, the orifices of the second inlet and of the second outlet being in the side walls of the drawer, preferably both being in the same side wall, such as the rear wall. What is achieved in this way is, on the one hand, that the air drawn in from outside the drawer to remove heat from the warm zone has to pass through the second heat exchanger and, on the other hand, that both the supply of air to the warm zone and the removal of air from the warm zone are able to take place directly laterally through the walls of the cabinet. In contrast to what is the case in DE 4 308 144, cooling the cooling unit to a lower temperature will then not result in further warming of an (other) section of the interior of the service trolley.

In order to be able to connect the cooling unit easily to a power supply network for supplying the Peltier elements with power, it is advantageous according to the invention if electrical contacts are provided on the outside of the drawer, which contacts are connected to Peltier elements in an electrically conducting manner. The drawer does not then have to be provided with batteries, accumulators or other means.

According to a further aspect, the present invention relates to a service trolley for use in an aircraft or train, the service trolley comprising a housing with a base, a ceiling, upright side walls as well as a door for access to the interior of the housing, characterised in that the service trolley contains a cooling unit according to the invention placed in the housing. Such a housing can also be considered to be a cabinet, which term has already been used above. With such a service trolley it is customary that two opposing side walls of the housing are provided on the inside with a multiplicity of pairs of drawer rails located above one another. With this arrangement it is then particularly advantageous according to the invention if the drawer of the cooling unit bears on one or more pairs of drawer rails. In this way the cooling unit can easily be slid as a drawer into the service trolleys that are already known.

To increase the cooling range, it is advantageous according to the invention if the interior of the housing and the interior of the warm zone of the drawer are separated from one another by a drawer wall, in other words are not connected to one another.

With a view to an optimum cooling effect, it is advantageous according to the invention if the cooling unit is placed in the top of the housing. In this way the phenomenon that heat naturally tends to rise and cold consequently tends to fall is utilised. This natural effect promotes the distribution of cold through the housing in a service trolley according to the invention.

For the purposes of a good supply of air from the surroundings for cooling the warm zone, it is advantageous according to the invention if the second outlet protrudes from the rear wall of the service trolley and if the orifice of the second inlet is likewise in the rear wall of the service trolley and specifically closer to the service trolley than the orifice of the second outlet. What can be achieved in this way is that the service trolley can be placed with the rear against a wall without the second inlet being closed off as a result; after all, the second outlet that protrudes from the rear wall of the service trolley ensures that the second inlet remains some distance away from said wall. In this way a slit-shaped gap is provided between said wall and the rear wall of the service trolley, via which gap air can be supplied for the purposes of cooling. With this arrangement it is particularly advantageous according to the invention if the second outlet then connects to an opening made in the wall for the removal of the warm air. With this arrangement discharge channels can then be made in the interior of the wall. It is also very readily conceivable that the wall is constructed as a sort of double wall with a cavity via which the warm air can be discharged.

In order to be able to connect a cooling unit placed in the service trolley to a power source, it is advantageous according to the invention if the service trolley is provided with electrical contacts that are accessible from the outside and that can be connected to, or are connected to, the Peltier elements of the cooling unit in an electrically conducting manner. In this context it is preferable to provide the electrical contacts on the cooling unit in such a way that these electrical contacts are accessible from the outside of the service trolley when the cooling unit has been placed in the service trolley. This can be achieved by providing an opening in one wall of the cabinet, via which opening the electrical contacts are accessible from the outside or via which opening the electrical contacts protrude from the service trolley. In this way no electrical contact between, on the one hand, the service trolley itself and, on the other hand, the cooling unit is needed. However, it is also conceivable to provide the service trolley with one or more electrical contacts connected to one another, which, on the one hand, can be connected to electrical contacts provided on the cooling unit and, on the other hand, can be connected to a power supply that can be coupled to the service trolley from the outside.

In order to be able to control the temperature in a service trolley it is advantageous according to the invention if the service trolley or the cooling unit is provided with one or more temperature sensors and control means for controlling the Peltier elements depending on the signals emitted by the temperature sensors. The control means will preferably be provided in the cooling unit itself. The reason for this is that this facilitates repair of the control means and periodic testing of the control means. According to the invention, the temperature sensors can be provided both in the cooling unit and in the service trolley, in particular the housing thereof. It is also conceivable to provide temperature sensors only in the cooling unit or to provide temperature sensors only in the service trolley, in particular the housing.

According to yet a further aspect, the present invention relates to a service trolley intended for use with a cooling unit according to the invention.

According to yet a further aspect, the present invention relates to a rack provided with, or at least intended for, a multiplicity of cooling units according to the invention, wherein the rack comprises a multiplicity of seats, each of which is suitable for accommodating at least part of a cooling unit according to the invention, wherein each seat is provided with contact means that, when the cooling unit has been inserted into said seat, are electrically connected to electrical contacts provided on the cooling unit, and wherein the contact means are connected to testing means for testing the operation of the Peltier elements and/or fans and/or control means of a cooling unit inserted in the said seat, and if the testing means are connected to indicator means for giving an indication that is representative of whether or not the cooling unit is functioning properly. Such a rack can be used as a storage system for storing a multiplicity of cooling units according to the invention. The advantage of such a storage system is that each time the cooling unit according to the invention is removed therefrom it can be certain that this cooling unit is also functioning properly and coincidentally is not malfunctioning.

In order to be able to see quickly and easily whether a cooling unit to be removed from the rack is functioning properly, it is advantageous according to the invention if the indicator means comprise a light source that can be switched on/off per seat, which light source is preferably on when the cooling unit is functioning properly. With this arrangement it is particularly advantageous if the light source is always provided next to the seat concerned, so that a rapid visual check can be carried out with the certainty that reliance is being placed on the correct light source.

According to yet a further aspect, the present invention relates to an aircraft or train containing a cooling unit according to the invention or containing a service trolley according to the invention.

The present invention will be explained in more detail below with reference to the drawing. In the drawing.

Figure 1:
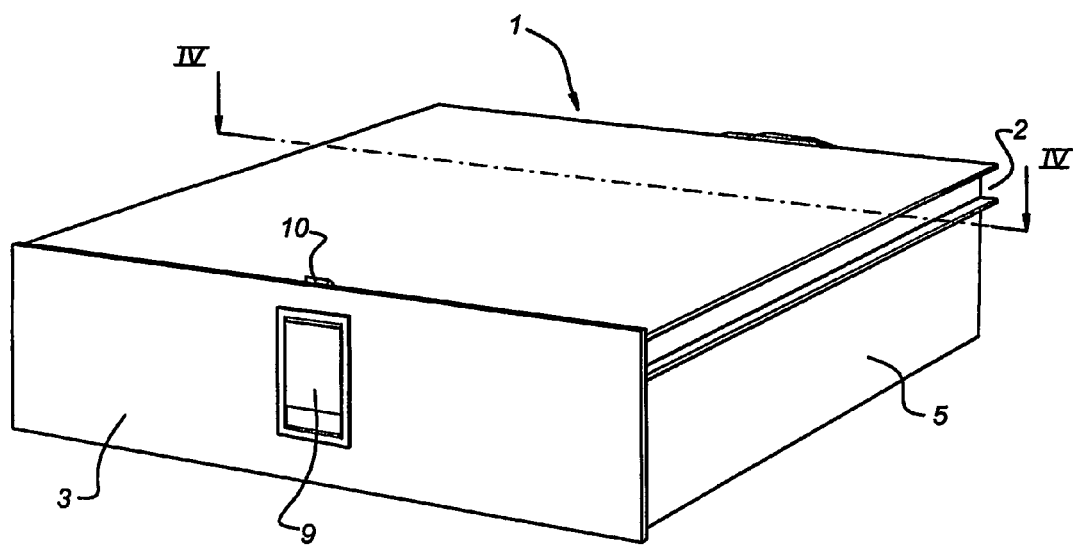
FIG. 1 shows a diagrammatic and perspective view of a cooling unit according to the invention from the front.
Figure 4:
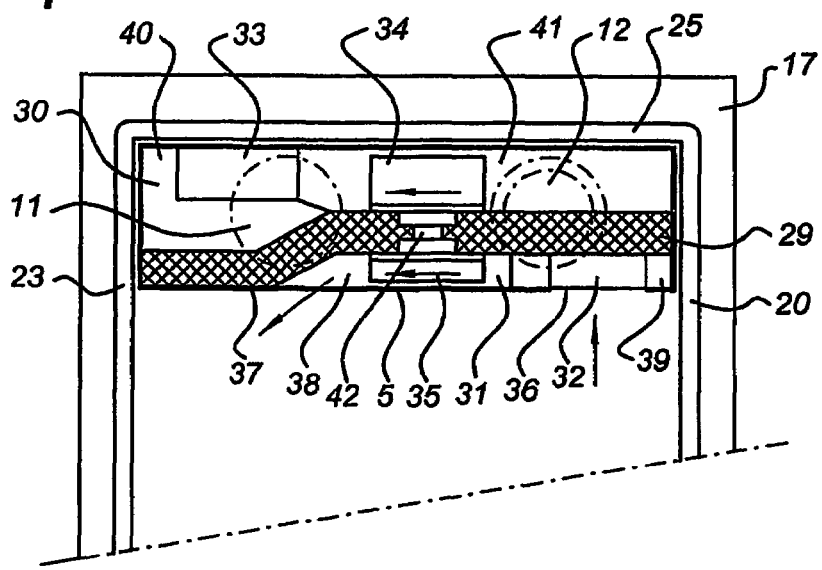
Figure 5:
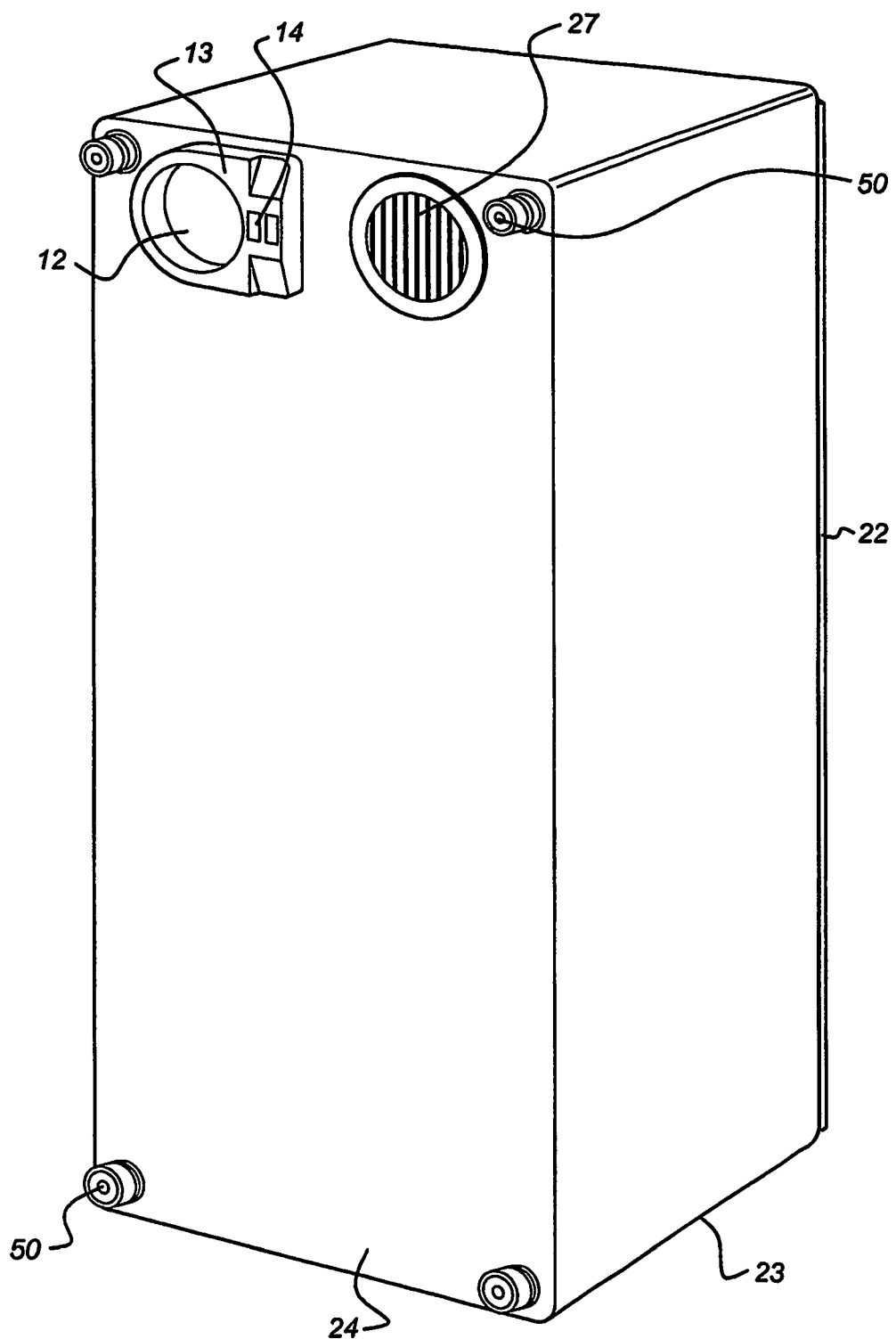

FIG. 4 shows a diagrammatic, sectional view of the cooling unit in accordance with the arrows IV from FIG. 1, the cooling unit being placed in a service trolley which, in turn, has been placed against a wall; and FIG. 5 shows a diagrammatic, perspective view of the rear of a cabinet of a service trolley according to the invention; and FIG. 6 shows, highly diagrammatically, a rack according to the invention.

Figure 2:
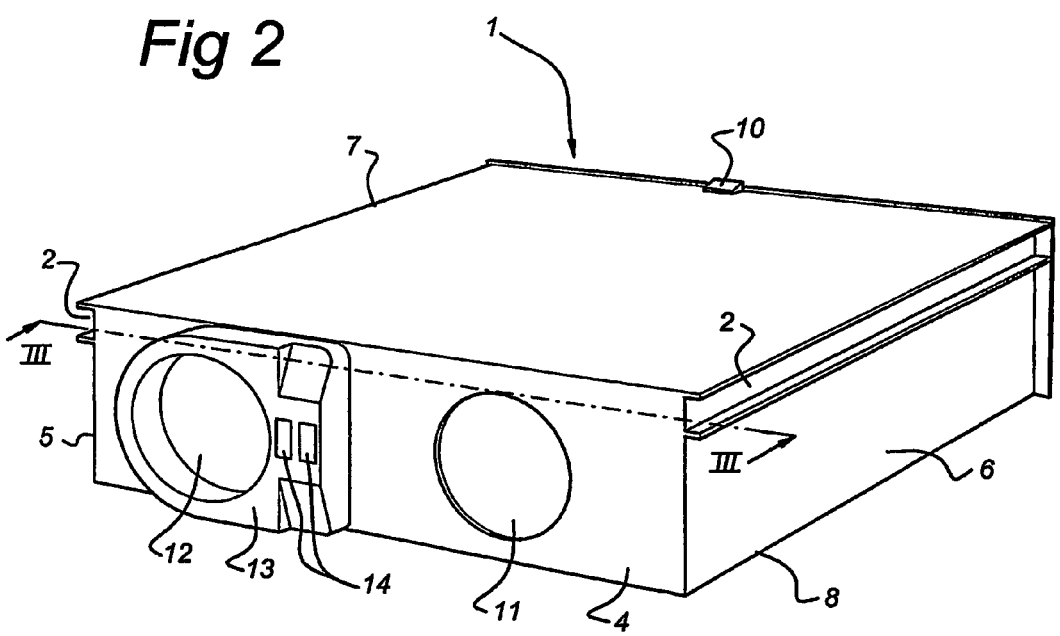
FIG. 2 shows a diagrammatic and perspective view corresponding to FIG. 1, but now from the rear.

FIGS. 1 and 2 show a cooling unit according to the invention in perspective and diagrammatically in a front view and rear view, respectively. The cooling unit 1 is in the form of a drawer with U-shaped guides 2 on opposing side walls, in which guides 2 drawer rails of a cabinet, in particular the cabinet of a service trolley for use in an aircraft or train, can be accommodated. The drawer has a front 3, a rear 4, two opposing longitudinal sides 5 and 6, a top 7, also termed ceiling, and a bottom 8, also termed base, that is not visible in FIGS. 1 and 2. The drawer is essentially a closed box, on the understanding that this box has a few openings that are still to be discussed below. At the front 3 the drawer is provided with operating means 9 with a lock 10 in order to fix the drawer in position when it has been completely pushed into the service trolley. An inlet, termed second inlet 11 here, is provided in the rear wall 4. A body 13 in which an outlet, termed second outlet 12 here, has been made is also provided on the rear wall 4. Electrical contacts 14, via which power can be fed to power-consuming means, which are contained in the drawer 1 and will be discussed further below, are also provided on the body 13. These power-consuming means, comprise, inter alia, fans, Peltier elements, sensors that are optionally present, control means that are optionally present, etc.

Figure 3:
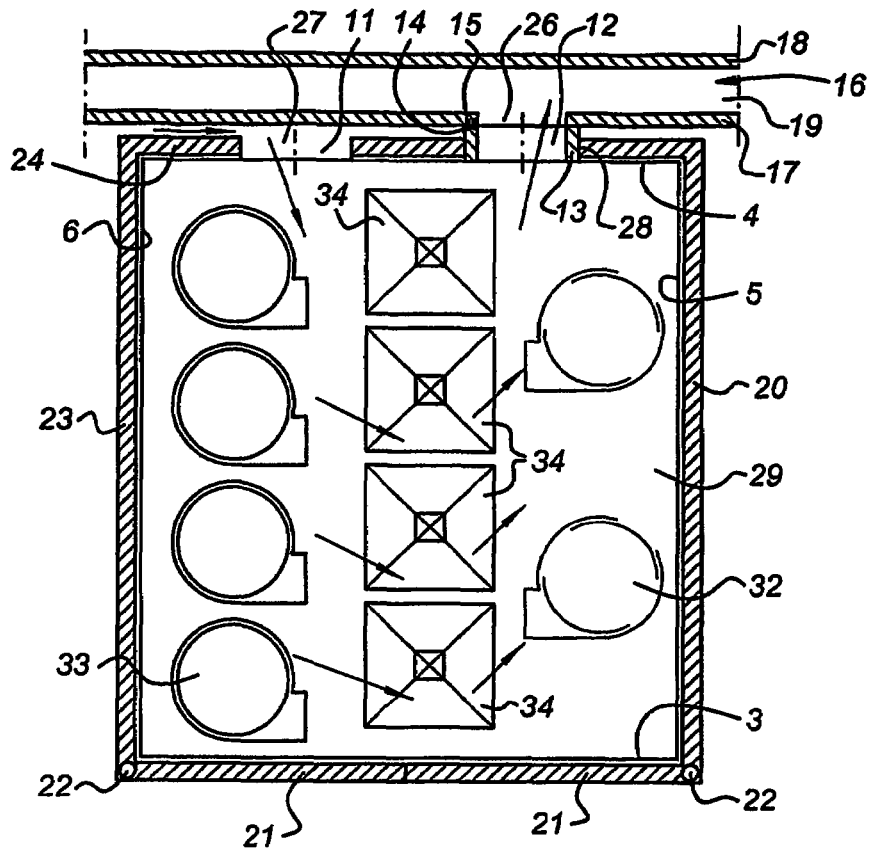
FIG. 3 shows in a diagrammatic plan view in accordance with the arrows III from FIG. 2 a section of a cooling unit according to the invention placed in a service trolley, which, in turn, has been placed against a wall.

FIG. 3 shows, highly diagrammatically, a cooling unit 1 in horizontal section in accordance with the arrows III in FIG. 2, which cooling unit 1 shown in section is, with this arrangement, also accommodated in a housing of a service trolley, which housing is also termed cabinet, and which cabinet has been placed against a wall 16. The wall 16 consists of a front wall panel 17 and a rear wall panel 18 with a cavity 19 between them. An opening 26 to the cavity 19 has been made in the wall panel 17.

Here the housing or cabinet has two opposing side wall panels 20 and 23, a rear wall 24 and a front wall consisting of two door panels 21 that are fixed to the side wall panels 20 and 23 by means of hinges 22. Two openings 27 and 28 have been made in the rear wall 24. Opening 27 is in line with the second inlet 11, which has been made in the rear wall 4 of the drawer of the cooling unit 1. Opening 28 has dimensions such that the body 13 can protrude through it. The body 13 is aligned with the opening 26 in the front wall panel 17.

FIG. 4 shows a view, partially in section, in accordance with the arrows IV in FIGS. 1 and 3. This view is a view towards the wall panel 17 with, placed in front of it, a housing of a service trolley containing a cooling unit according to the invention, service trolley and cooling unit being shown exposed in sectional view. FIG. 4 makes it visible, in particular, that the cooling unit is subdivided by a layer of insulating material 29 into a so-called warm zone 30 located above the layer 29 and a so-called cold zone 31 located beneath the layer 29. A series of Peltier elements 42 are incorporated in the heat-insulating layer 29. Each Peltier element 42 consists, as such, of a number of semiconductor blocks. The Peltier elements 42 have a cold side 44 and warm side 43. Both sides consist of a layer of ceramic material that is electrically insulating but thermally conducting. A second heat exchanger 34, which is located in the so-called warm zone 30, is fixed to the layer of ceramic material 43 and a first heat exchanger 35, which is located in the so-called cold zone 31, is fixed to layer of ceramic material 44. The second heat exchangers 34 divide the warm zone 30 into a second inlet chamber 40 and a second outlet chamber 41. The second inlet chamber 40 is in communication with the outside by means of the second inlet 11. The second outlet chamber 41 is in communication with the outside by means of the second outlet 12. The first heat exchangers 35, which extend below the second exchangers 34, divide the cold zone 31 into a first inlet chamber 39 and a first outlet chamber 38. The first inlet chamber 39 has an inlet with inlet orifice 36 and an outlet with outlet orifice 37. A first fan 32 has been installed in the first inlet chamber, directly adjoining the first inlet orifice 36, which fan 32 draws in air, as is indicated by means of the arrows, from the area below the cooling unit 1 so as then to blow this air in the horizontal direction towards the left in FIG. 4 through the first heat exchanger 35, after which this air is blown back again via the first outlet 37 into the area below the cooling unit 1. On passing through the first heat exchanger 35 the air will be cooled because the Peltier element 42 withdraws heat from said air via heat exchanger 35 and discharges this heat to the second heat exchanger 34. At the second heat exchanger 34 said heat is then released into air drawn in from the surroundings by means of second fans 33. The second fans 33 blow said air, which has been drawn in, through the second heat exchangers 34, after which said air, in which additional heat has been taken up, escapes from the cooling unit via the second outlet chamber 41 through the second outlet 12.

As is illustrated in FIG. 3, the body 13 produces a slit between the wall panel 17 and the rear wall 24 of the housing of the service trolley. As is indicated by means of arrows, this slit allows air to be drawn in from the surroundings via second inlet 11. The heated air discharged via second outlet 12 passes into the cavity 19 of the wall 16. This prevents the heated air being drawn in immediately again via the second inlet 11, which would have an adverse effect on the cooling effect of the cooling unit 1.

It can also be seen in FIG. 3 that the electrical contacts 14 make contact with electrical contacts 15 fitted in the wall 17. These electrical contacts 15 are connected to a power source that is not shown. In this way the fans 32, 33 and the Peltier elements 42 in the cooling unit 1 are provided with power. It will be clear that for this purpose the electrical contacts 14 are connected to said fans and Peltier elements in an electrically conducting manner.

FIG. 5 shows a rear view of a housing of a service trolley according to the invention. It can clearly be seen in this figure that the body 13 of the cooling unit protrudes through the rear wall 24 of the housing and that an opening 27 with a grating thereon is provided alongside the body 13 in the rear wall 24 of the housing. The housing as shown in FIG. 5 will have been placed on a trolley frame, which trolley frame has a chassis with wheels and preferably also a push/pull handle. Such a service trolley is described in the Netherlands application in the name of the Applicant filed at the same time, which has a date of filing that is the same as that of the present application. The application concerned filed at the same time is entitled "Service trolley for use in an aircraft or train, trolley frame therefor, and passenger aircraft or passenger train provided with such a service trolley or such a trolley frame". However, it will be clear that the housing shown in FIG. 5 can equally well form part of a service trolley where the housing is not detachable from the trolley frame, i.e., for example, wheels can be provided on the underside of the housing, attached directly to the housing, whilst a push/pull handle could be provided at the top of the housing, directly on the housing.

FIG. 6 shows, highly diagrammatically in section, a rack 60 according to the invention. The rack 60 is provided with a number of seats 61 into which a cooling unit 1 according to the invention can be inserted. Sockets 62 are provided per seat 61, which sockets 62 are able to make contact with the contacts 14 of a cooling unit 1 inserted in the respective seat 61. These sockets 62 are connected to a control unit 64 which, in turn, is connected to a lamp 63. The control unit 64 is so equipped that this is able to supply power to the contacts 14 via the sockets 62 and that, on the basis of this current, the control unit 64 is able to determine whether the fans and/or Peltier elements and/or other means provided in the cooling unit 1 that operate under the influence of electricity are functioning correctly. If the means are functioning correctly the control unit 64 will then control the lamp 63 to switch it on.

FIG. 5 also shows that mushroom-shaped guide projections are provided on the rear of the housing that are able to engage in T-shaped undercut slots, which are not shown and which have been made in the wall 17. This connection between the housing and the wall 17 is the subject of Netherlands patent application 1 021 107, filed on 18 Jul. 2002, in the name of the Applicant.

The invention claimed is:

1. Cooling unit (1) for a service trolley for use in an aircraft or train, the cooling unit comprising a drawer, and the drawer comprising:
   a partition (29), which partition separates a warm (30) and cold zone (31) in the drawer;
   one or more Peltier elements (42) with a side (43) that gives off heat and a side (44) that takes up heat;
   one or more first fans (32) provided in the cold zone (31) for feeding air to be cooled through the cold zone (31);
   one or more second fans (33) provided in the warm zone (30) for feeding air removing heat through the warm zone (30); characterised in that the drawer is a box essentially closed by walls (3, 4, 5, 6, 7), in that the partition comprises a layer (29) of heat-insulating material and in that the one or more Peltier elements (42) are located in the heat-insulating layer (29) with the side giving off heat facing the warm zone (30) and with the side taking up heat facing the cold zone (31), and wherein one or more heat-conducting first heat exchangers (35) joined to the cold side (44) of the Peltier elements (42) are provided in the cold zone (31) and one or more heat-conducting second heat exchangers (34) joined to the warm side (43) of the Peltier elements (42) are provided in the warm zone (30), the first heat exchangers (35), the heat-insulating layer (29) and the walls (3, 4, 5, 6, 7) of the drawer dividing the cold zone (31) into a first inlet chamber (39) with a first inlet opening (36) into the service trolley and into a first outlet chamber (38) with a first outlet opening (37) into the service trolley.

2. Cooling unit according to claim 1, wherein the second heat exchanger (34), the heat-insulating layer (29) and the walls (3, 4, 5, 6, 7) of the drawer divide the warm zone (30) into a second inlet chamber (40) with a second inlet (11) and a second outlet chamber (14) with a second outlet (12), the orifices of the second inlet (11) and the second outlet (12) being in the side walls (3, 4, 5) of the drawer, preferably both being in the same side wall (3, 4, 5), such as the rear wall (4).

3. Cooling unit according to claim 1, characterised in that the orifices of the first inlet (36) and the first outlet (37) both extend in a horizontal plane, the first outlet (37) preferably being so constructed that the outflow direction is at an angle and oriented away from the vertical axis through the first inlet (36).

4. Cooling unit according to claim 1, wherein electrical contacts (14) are provided on the outside of the drawer, which contacts are connected to the Peltier elements (42) in an electrically conducting manner.

5. Service trolley for use in an aircraft or train, the service trolley comprising a housing with a base, a ceiling, upright side walls (22, 23) as well as a door (21) for access to the interior of the housing, characterised in that the service trolley contains a cooling unit (1) according to claim 1 placed in the housing.

6. Service trolley according to claim 5, wherein the interior of the housing and the interior of the warm zone (30) of the drawer are separated from one another by a drawer wall (7).

7. Service trolley according to claim 5, wherein two opposing side walls of the housing are provided on the inside with a multiplicity of pairs of drawer rails located above one another and wherein the drawer of the cooling unit bears on one or more pairs of drawer rails.

8. Service trolley according to claim 5, wherein the cooling unit (1) is placed in the top of the housing.

9. Service trolley according to claim 5, wherein the second outlet (12) protrudes from the rear wall (24) of the service trolley and wherein the orifice of the second inlet is closer to the service trolley than the orifice of the second outlet (12).

10. Service trolley according to claim 5, wherein the service trolley is provided with electrical contacts on the outside that can be connected to the Peltier elements (42) of the cooling unit (1) in an electrically conducting manner.

11. Service trolley according to claim 5, which service trolley (1) is provided with one or more temperature sensors and control means for controlling the Peltier elements (42) depending on the signals emitted by the temperature sensors.

12. Service trolley intended for use with a cooling unit (1) according to claim 1.

13. Combination of a service trolley according to claim 5 and a wall (16), wherein the wall (16) is provided on the inside with at least one channel (19) for supply or discharge, preferably discharge, of air and wherein at least one opening (26) that opens into said channel (19) is provided in the wall (15), to which opening the second inlet (11) or second outlet (12), respectively, of the cooling unit (1) can be connected.

14. Combination according to claim 13, wherein the wall (16) comprises two wall panels (17, 18) with a cavity (19) forming the at least one channel between them.

15. Rack (60) provided with, or at least intended for, a multiplicity of cooling units (1) according to claim 1, wherein the rack (60) comprises a multiplicity of seats (61), each of which is suitable for accommodating at least part of a cooling unit (1), wherein each seat (51) is provided with contact means (62) that, when the cooling unit has been inserted into said seat, are electrically connected to electrical contacts (14) provided on the cooling unit, and wherein the contact means (62) are connected to testing means (64) for testing the operation of the Peltier elements (42) and/or fans (32, 33) and br control means of a cooling unit (1) inserted in the said seat (51), and wherein the testing means (64) are connected to indicator means (63) for giving an indication that is representative of whether or not the cooling unit (1) is functioning properly.

16. Rack (60) according to claim 15, wherein the indicator means (63) comprise a light source that can be switched on/off per seat (51), which light source is preferably on when the cooling unit is functioning properly.

17. Aircraft or train containing a cooling unit according to claim 1.

18. Cooling unit according to claim 2, characterised in that the orifices of the first inlet (36) and the first outlet (37) both extend in a horizontal plane, the first outlet (37) preferably being so constructed that the outflow direction is at an angle and oriented away from the vertical axis through the first inlet (36).

19. Service trolley according to claim 6, wherein two opposing side walls of the housing are provided on the inside with a multiplicity of pairs of drawer rails located above one another and wherein the drawer of the cooling unit bears on one or more pairs of drawer rails.

* * * * *